Figure 1:
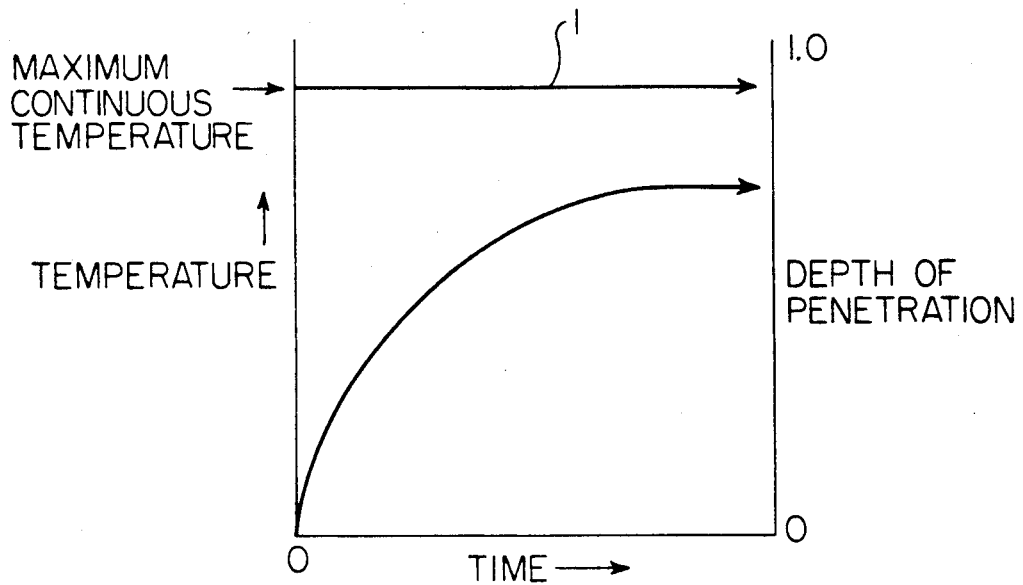

United States Patent [19]

Paterson et al.

[11] Patent Number: 5,106,901

[45] Date of Patent: Apr. 21, 1992

[54] THERMALLY RESISTANT MATERIALS

[75] Inventors: John R. Paterson, Cumbria; Leonard Warren, Manchester, both of Great Britain

[73] Assignee: Vickers Shipbuilding & Engineering Limited, Great Britain

[21] Appl. No.: 456,821

[22] Filed: Dec. 13, 1989

[51] Int. Cl.$^5$ .......................... C08J 5/10; C08K 3/34; C08L 15/00

[52] U.S. Cl. ................... 524/444; 524/431; 524/443

[58] Field of Search ........................ 524/431, 443, 444

[56] References Cited

U.S. PATENT DOCUMENTS

| | | | |
|---|---|---|---|
| 2,718,544 | 9/1955 | Shepp | 174/113 |
| 3,108,985 | 10/1963 | Weyer | 260/37 |
| 3,137,670 | 6/1964 | Maneri et al. | 524/431 |
| 3,551,377 | 12/1970 | Andrianov | 524/431 |
| 3,576,388 | 4/1971 | Bruns | 174/116 |
| 3,710,007 | 1/1973 | Hoeg et al. | 174/120 |
| 4,176,093 | 11/1979 | Zoch | 252/478 |
| 4,246,359 | 1/1981 | Whelan | 524/431 |
| 4,470,898 | 9/1984 | Penneck et al. | 252/511 |
| 4,600,806 | 7/1986 | Beretta | 174/121 |
| 4,634,615 | 1/1987 | Versteegh et al. | 428/36 |
| 4,707,763 | 11/1987 | Kudo | 361/386 |
| 4,726,993 | 2/1988 | Zeopo | 428/379 |
| 4,769,412 | 9/1988 | Inoue et al. | 524/431 |
| 4,859,365 | 8/1989 | Peninger | 524/431 |

FOREIGN PATENT DOCUMENTS

| | | |
|---|---|---|
| 0050360 | 4/1982 | European Pat. Off. |
| 53-21410 | 3/1978 | Japan |
| 1049400 | 11/1966 | United Kingdom |
| 1213739 | 11/1970 | United Kingdom |
| 1215100 | 12/1970 | United Kingdom |
| 1255132 | 11/1971 | United Kingdom |
| 1284082 | 8/1972 | United Kingdom |
| 1298657 | 12/1972 | United Kingdom |
| 2028833 | 3/1980 | United Kingdom |
| 1564882 | 4/1980 | United Kingdom |

Primary Examiner—Paul R. Michl
Assistant Examiner—U. K. Rajguru
Attorney, Agent, or Firm—Pollock, VandeSande & Priddy

[57] ABSTRACT

Thermally resistant materials comprise an elastomer, particulate iron oxide, and at least one other particulate additive selected from the group consisting of aluminum silicate and silicon carbide. The material may be in the form of a self-supporting element or in the form of a coating.

7 Claims, 1 Drawing Sheet

THERMALLY RESISTANT MATERIALS

This invention relates to thermally resistant materials.

The effects of uncontrolled fires in buildings, ships, aircraft, and the like can be horrific. In many cases, the victims are not killed by the heat itself but are suffocated by the smoke. Frequently this smoke contains toxic substances A further cause of fatalities in fires is when power failures occur and people get lost in the darkness (or in dense, opaque smoke) trying to find exits, or are trapped in lifts, and the like.

Another extremely hostile environment occurs inside nuclear reactors where high levels of, for example, $\gamma$-radiation and neutron bombardment, in addition to elevated temperatures, are present. Such an environment, like that of a fire, places great demands on, for example, the insulation covering electrical cables, bushing and grommet materials, mouldings covering and/or protecting components and the like.

There is thus a need for a material with electrically insulating properties and which can resist the effect of fires and/or high temperatures to protect any component which it is covering. The material must be able to retain its thermal and electrically insulating properties and operate on a continuous basis (i.e. as opposed to for only a short term duration). Further requirements are that no toxic vapours should be produced and that any smoke produced should be largely translucent (so that personnel in the environment may be able to see their escape routes). It is further desirable that, under the effect of neutron bombardment etc, substances in the material should not be converted into radionuclides. Also, in the case where the material is used in a nuclear reactor, it should include no substances in the matrix which would have an adverse effect on the reactor. Further, the material should also be able to withstand, and still function satisfactorily under, conditions of shock and vibration.

It is an object of the invention to provide a material having one or more of the above properties.

According to the present invention there is provided a heat resisting material comprising an elastomer in admixture with iron oxide and at least one of aluminum silicate and silicon carbide.

The material of the present invention resists the presence of high temperatures, including direct exposure to fires, and/or nuclear radiation by undergoing physical and chemical changes to produce a heat resistant surface layer which protects, and insulates, the underlying material. The material also provides electrical insulation before, during and after exposure to the above hazards.

The iron oxide, which is preferably ferric oxide (haematite), and the other additive(s) are in particulate form. Preferably they are in the form of fine powders and are admixed with (uncured) liquid elastomer before the addition of the curing catalyst to cause polymerization of the liquid elastomer. Preferably the liquid elastomer is of the addition reaction poly-dimethyl siloxane type which may be polymerized using platinum-based complexes as the curing catalyst. The aluminum silicate may be present in the form of microspheres and a size range 30–80 $\mu$m is preferable.

Typical ranges for the components of the material are:

| Additive | % by Weight | Specific Gravity |
| --- | --- | --- |
| Ferric Oxide | 3–30 | 5.12 |
| Aluminium Silicate | 15–48 | 2.61 |
| Silicon Carbide | 10–40 | 3.17 |
| Silicon Elastomer (C, H, O, Si) | Balance | — |

For applications involving neutron bombardment, the main additive should be silicon carbide. Aluminum compounds could be used, but are not preferred as, under these conditions, aluminum can be changed to a strongly radioactive isotope of scandium. If aluminum silicate is present, this is preferably in the form of microspheres.

Figure 2:
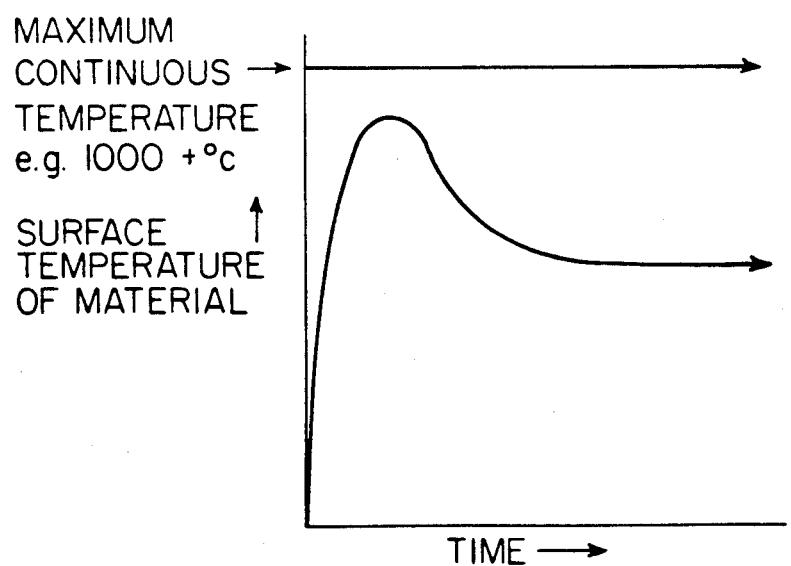

For a better understanding of the invention and to show how the same may be put into effect, reference will be made, by way of example only, to the accompanying drawings, in which:

FIG. 1 is a graph of temperature against time and penetration depth against time for a material according to the invention when exposed to a constant elevated temperature environment, and FIG. 2 is a graph of temperature against time for a material according to the invention showing the variation of actual temperature of the surface with time when exposed to a constant temperature environment.

There are three mechanisms by which heat is transferred to a body
Conduction
Convection and
Radiation Convection of hot gases and radiation are the main means of heat transfer across a space between bodies while conduction is a major factor where the bodies are in intimate contact, e.g. in the case of bushes, grommets, etc. In a hot fire situation, e.g. T>1000° C., radiation is by far the most important factor. Within the body, the main factors are conduction of heat through the material of the body and convection and re-radiation of heat away from the surface of the body. The duration of the fire affects the relative importance of each factor.

If a material is to provide thermal protection, it must exhibit three properties:
i) it must have a low coefficient of thermal diffusivity
ii) it must be able to dissipate incident energy in a highly efficient manner
iii) it must be mechanically strong.

The material of the invention has a low coefficient of thermal diffusivity and the need for this is self-evident in that heat incident on the surface of the material should have as difficult a passage as possible through the material. However, irrespective of how good an insulator a material is, heat incident on the surface of the material will eventually pass through the material unless it can be re-radiated and/or convected from the exposed surface. Thus re-radiation of heat incident on the surface of the material is a critical feature.

The Stefan-Boltzmann law states that the radiation emitted by a body is proportional to the fourth power of the absolute temperature. Kirchhoff's law recognizes that bodies radiate as well as receive radiation; at thermal equilibrium, these two values will equate.

Thus, assuming equal areas, the net heat H gained, or lost, by the material is:

$$H = \text{Incident energy} - \text{Re-radiated energy}$$
$$= \epsilon_1 \sigma T_1^4 - \epsilon_2 \sigma T_2^4$$

where
$\epsilon$ = constant (emissivity)
$\sigma$ = Stefan-Boltzmann Constant
T = absolute temperature
1 = refers to the incident energy
2 = refers to the re-radiated energy.

In this example $\epsilon$ would represent the emissivity of the material. For a 'black body', $\epsilon = 1$, but in practice it has a value of between 0 and 1. The material of the invention includes a combination of additives which react to produce a refractory surface in which $\epsilon_2$ is maximized and $\epsilon_1$ is minimized so that the greatest difference between $T_2$ and $T_1$ can be achieved at thermal equilibrium, i.e. when $H = 0$.

Also, the material of the invention produces a refractory surface which is mechanically strong enough to hold itself together as well as to resist major external forces, e.g. blasts of hot gases, shock loadings, vibration, and the like.

The preferred combination of additives is a mixture of red ferric oxide (haematite) with one, or both, of aluminum silicate and silicon carbide all in a silicon-based elastomer. All the additives are in particulate form and preferably are in the form of finely divided powders. Advantageously, the aluminum silicate has a size of 30-80 μm and all the other additives are generally far finer e.g. the silicon carbide should be from about 3 to 6 μm in size. They are preferably intimately mixed with the liquid elastomer before the addition of the curing catalyst. The resultant composition is then cast, extruded, moulded or otherwise used in the normal manner for such elastomer compositions prior to polymerization to give the desired heat resistant material in the form of coatings e.g. as cable insulation or in the form of self-supporting elements such as sheets, bushes, covers, and the like.

When the finished material is exposed to heat, changes occur in a progressive manner. Firstly, volatile material from the elastomer vapourises. During this process, the additive powders are brought into more intimate contact. As the temperature rises, one or more complex reactions start to occur between the additives and the residual silicone in the elastomer to produce a "refractory char" which is mechanically strong, is firmly bonded to the underlying unchanged material and has a semi-porous structure with very low thermal diffusivity. If the exposure to heat continues, the changes will penetrate deeper into the underlying material until a situation is reached where the heat lost from the exposed surface is equal to that incident upon it. As the refractory char gets thicker, the heat will penetrate to the underlying material at an ever slower rate.

This situation is shown in FIG. 1 of the accompanying drawings where the temperature of a point on the material surface gradually rises towards line 1 representing the constant temperature of the fire. The reason why the curve does not approach line 1 is mainly due to the re-radiative powers of the refractory char. Convection will also play a part. Using the right hand axis, the curve shows how, for any particular temperature, maximum penetration depth in the material is reached with time.

FIG. 2 of the accompanying drawings shows in detail (as opposed to the generality of FIG. 1) how the surface temperature of the material changes with time when exposed to a constant temperature environment. The temperature initially rises steeply due to the input of radiant energy until the reaction(s) occur to form the refractory char. While the reactions are occurring the rise levels off and then starts to fall as the re-radiative processes become established. After a given time, the temperature becomes constant as heat input equals heat output.

Typical formulations for the heat resistant materials are given below. As can be seen, the solid content is normally in the range of about 40-50% by weight.

| Ferric Oxide | Silicon Carbide | Aluminium Silicate | Liquid Elastomer and curing catalyst |
|---|---|---|---|
| 7½ | 20 | 20 | 52½ |
| 7½ | 10 | 30 | 52½ |
| 7½ | 35 | — | 57½ |

Experiments have indicated that a content of 7½% by weight of ferric oxide is optimum but the actual formulation used in any given case will depend on a variety of factors, e.g. availability, price, particular application (e.g. radioactivity). Iron oxide would always be present.

To produce a sample of the material, the ingredients should be weighed out to an accuracy of ±1%. Then the liquid elastomer is placed in a mixer and the powdered additives are added progressively. It is preferred that the additives are added separately to the liquid elastomer and thoroughly mixed. Each additive should be added progressively so that there is a maximum wetting of the powder surface and a minimum agglomeration of solid particles. Sequential addition of each additive in a progressive manner gives the most uniform distribution of solids throughout the liquid elastomer. When the liquid elastomer and the additives have been thoroughly mixed, the curing catalyst (vulcanizing agent)(part of the total elastomer weight) is added, followed by further vigorous mixing. The composition is then ready for casting, extruding, etc. to form the desired heat resistant material.

The particular quantities of aluminum silicate may be varied to affect the density of the final material. If the density is too great, there will be too much solid additive and this will affect the hydrostatic properties and seriously affect the elastomeric properties of the material. Too great a density will cause adverse absorption of the elastomer (rubber).

The role of red ferric oxide is chiefly to absorb the heat of reaction to stop the fire spreading over the surface of the material. The absorptivity for any material is (1-emissivity), i.e. $1 - \epsilon$. For the refractory char $\epsilon_2$ is very much greater than $(1 - \epsilon_1)$, i.e. the absorptivity of the virgin material so that, after formation, the refractory char acts as an excellent re-radiator. The other additive(s) will also stop the spread of fire along the surface of the material.

For nuclear environments, where neutron bombardment will be a problem, aluminum compounds are not preferred as the metallic nucleus can be converted to a highly radioactive isotope of scandium. Unfortunately, iron also forms a radioactive isotope under neutron bombardment but this is not highly radioactive and has a short half life. Thus, as iron is of prime importance from thermal considerations, the mild radioactivity from its isotope is tolerable.

Further important points are that the refractory char is mechanically strong, firmly bonded to the underlying material, semi-porous and an excellent thermal insulator. The mechanical strength and bonding are essential to protect the underlying material. Intumescent materials, which swell during burning and provide an insulating barrier, are known but they are mostly mechanically weak and/or poorly bonded to the underlying material. External effects such as blasts of air, shock loading or vibration etc. would break such intumescent insulation free of the underlying material and so all thermal protection would be lost.

The semi-porous nature of the material of the invention, which further benefits the low thermal conductivity of the refractory matrix, is important in that, when heat is conducted into the underlying material, the volatile components of the elastomer can be released without rupturing the protective surface which has already formed. Thus, if the fire is of long duration when, irrespective of how good an insulator the surface char may be, some heat will be conducted through to the underlying material, the reaction sequence will slowly continue at the char-underlying material interface thus gradually increasing the thickness of the char and increasing the level of thermal protection to the remaining underlying material and to the component(s) being protected by the material.

The heat resistant material of the present invention constitutes a very significant advance in the known levels of thermal and fire protection. The basic formulation may be varied to suit a wide range of applications. The uses of the material range from the production of self-supporting elements such as bushings, grommets, or sheets for, for example covering the walls of a room or compartment or as part of a multilayer fabric, to coatings such as electrical insulation on cabling, and covers for components. The material has been developed from basic scientific principles and thoroughly tested. For example, material in accordance with the invention can resist, for example, a gas torch at 1400° C. or a conventional fire at 1000+° C. for an indefinite period. The protective char formed is mechanically strong enough to resist vibration, shock loading and minor impacts and continues to function normally even under continuous neutron bombardment. Tests have shown that no toxic smoke is produced and that, what little smoke there is, is light grey in colour, allowing 75% of light transmission, so that it should not impede potential victims from finding the exits or rescue personnel in carrying out their duties.

The following Example illustrates the invention.

EXAMPLE 35 parts by weight of aluminum silicate microspheres having a particle size of about 55 μm were added slowly to an addition curing poly-dimethyl siloxane elastomer and thoroughly mixed therewith. Thereafter, 7½ parts by weight of red iron oxide having a particle size of about 5 μm were then slowly added with thorough mixing. Sufficient platinum-based curing catalyst to cure the liquid elastomer was then thoroughly incorporated in the mixture. The resultant mixture contained 57½ parts by weight of liquid elastomer including curing catalyst. The mixture was then immediately applied to an electrical bus bar in a mould so as to form a coating of the mixture thereon and allowed to cure in an oven for at least 20 minutes at 80° C. The coating had good electrically insulating properties.

In a test simulating real accident conditions, the coated bus bar was exposed to fire and it was found that the coating was slowly converted into a refractory char which was tightly bonded to the underlying surface and which continued to provide satisfactory electrical resistance.

We claim:

1. A heat resisting material comprising an elastomer in admixture with ferric oxide in an amount of from 3 to 30% by weight of the material and at least one of aluminum silicate and silicon carbide, the aluminum silicate when present, being in an amount of from 15 to 48% by weight of the material and the silicon carbide, when present, being in an amount of from 10 to 40% by weight of the material.

2. A material as claimed in claim 1 wherein the iron oxide is red ferric oxide.

3. A material as claimed in claim 1 wherein the elastomer is a silicone elastomer.

4. A material as claimed in claim 1 which contains aluminum silicate in the form of microspheres.

5. A material as claimed in claim 1 in the form of a bushing, grommet, sheet or other self-supporting element.

6. A material as claimed in claim 1 in the form of a coating on a component.

7. A material as claimed in claim 6 which is in the form of an electrically insulating coating for an electrical cable.

* * * * *